(12) United States Patent
Xu et al.

(10) Patent No.: US 11,307,917 B2
(45) Date of Patent: Apr. 19, 2022

(54) DECENTRALIZED CYBER-PHYSICAL SYSTEM

(71) Applicant: Delta Electronics Int'l (Singapore) Pte Ltd, Singapore (SG)

(72) Inventors: Zhiheng Xu, Singapore (SG); Jun Xian Daniel Ng, Singapore (SG); Omar Bataineh, Singapore (SG); Arvind Easwaran, Singapore (SG); Sidharta Andalam, Singapore (SG); Bo Woon Jeffrey Soon, Singapore (SG)

(73) Assignee: DELTA ELECTRONICS INTL (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/992,719

(22) Filed: Aug. 13, 2020

(65) Prior Publication Data
US 2021/0049061 A1    Feb. 18, 2021

(30) Foreign Application Priority Data

Aug. 16, 2019  (IN) .............................. 201921033059

(51) Int. Cl.
*G06F 11/07* (2006.01)
*G05B 23/02* (2006.01)

(52) U.S. Cl.
CPC ...... *G06F 11/0757* (2013.01); *G05B 23/0205* (2013.01); *G05B 23/0254* (2013.01); *G06F 11/0709* (2013.01); *G05B 2219/32181* (2013.01)

(58) Field of Classification Search
CPC ............. G06F 11/0757; G06F 11/0709; G06F 11/3089; G06F 11/3058; G06F 11/3065;
(Continued)

(56) References Cited

U.S. PATENT DOCUMENTS 8,024,396 B2    9/2011  Sedukhin et al.
8,707,316 B1    4/2014  Wang et al.
(Continued)

FOREIGN PATENT DOCUMENTS

CN    109697330 A    4/2019
TW    201824166 A    7/2018
(Continued)

OTHER PUBLICATIONS

"Haque et al. Contract-Based Hierarchical Resilience Management for Cyber-Physical Systems, Nov. 2018, IEEE, pp. 1-10, https://ieeexplore.ieee.org/stamp/stamp.jsp?tp=&arnumber=8625911" (Year: 2018).*

(Continued)

*Primary Examiner* — Santosh R Poudel
(74) *Attorney, Agent, or Firm* — Kirton McConkie; Evan R. Witt (57) ABSTRACT

The disclosure relates to a decentralized cyber-physical system including a managing unit and a plurality of components. The managing unit includes a root resilient manager including a root contract and a sub-contract generator. The sub-contract generator is configured to decompose the root contract into a plurality of sub-contracts and assign the plurality of sub-contracts to the plurality of components, respectively. Each component includes at least one observer configured to monitor if the property of the individual component violates the sub-contracts corresponding thereto. When one of the plurality of sub-contracts violates during the runtime of the decentralized cyber-physical system, the root resilience manager issues an alarm.

10 Claims, 8 Drawing Sheets

(58) Field of Classification Search
CPC ............ G06F 11/3013; G06F 11/3006; G05B 23/0254; G05B 23/0205; G05B 2219/32181; G05B 19/4184; G05B 19/41845
See application file for complete search history.

(56) References Cited

U.S. PATENT DOCUMENTS

| | | | |
|---|---|---|---|
| 9,424,149 | B2 | 8/2016 | Knight |
| 9,942,245 | B2 | 4/2018 | Ji |
| 10,248,487 | B1* | 4/2019 | Garg ................ G06F 11/0769 |
| 2009/0037571 | A1* | 2/2009 | Bozak ............... G06F 11/3093 709/224 |
| 2012/0117423 | A1 | 5/2012 | Andrade et al. |
| 2014/0229221 | A1* | 8/2014 | Shih .................. G06F 9/5038 705/7.23 |
| 2019/0230106 | A1 | 7/2019 | Abbaszadeh et al. |
| 2019/0270118 | A1* | 9/2019 | Araujo-Simon ......... G06N 7/00 |

FOREIGN PATENT DOCUMENTS

| | | |
|---|---|---|
| TW | 201931119 A | 8/2019 |
| WO | 2015158663 A1 | 10/2015 |
| WO | 2016004973 A1 | 1/2016 |
| WO | 2016009356 A1 | 1/2016 |
| WO | 2017066348 A1 | 4/2017 |

OTHER PUBLICATIONS

A. Benveniste, B. Caillaud, D. Nickovic, R. Passerone, J.-B. Raclet, P. Reinkemeier, "Contracts for System Design", NRIA, Research Report RR-8147, Nov. 2012.

K. Sen, A. Vardhan, G. Agha, and G. Rosu. "Efficient decentralized monitoring of safety in distributed systems". In Proceedings of the 26th International Conference on Software Engineering, ICSE '04, pp. 418-427. IEEE Computer Society, 2004.

Andreas Klaus Bauer and Ylies Falcone "Decentralised LTL monitoring". In FM 2012: Formal Methods—18th International Symposium, Paris, France, pp. 85-100, 2012.

M. Mostafa and B. Bonakdarpour. "Decentralized runtime verification of LTL specifications in distributed systems" In 2015 IEEE International Parallel and Distributed Processing Symposium, pp. 494-503, 2015.

I. Filippidis and R. M. Murray, "Layering assume-guarantee contracts for hierarchical system design," Proceedings of the IEEE, vol. 106, No. 9, pp. 1616-1654, 2018.

T. T. H. Le, R. Passerone, U. Fahrenberg, and A. Legay, "Contract-based requirement modularization via synthesis of correct decompositions," ACM Transactions on Embedded Computing Systems (TECS), vol. 15, No. 2, p. 33, 2016.

Federal Ministry of Education and Research (BMBF), Germany. (Aug. 2018) Industry 4.0 [Online] Available: https://www.bmbf.de/de/zukunftsprojekt-industrie-4-0-848.html.

* cited by examiner

DECENTRALIZED CYBER-PHYSICAL SYSTEM

CROSS-REFERENCE TO RELATED APPLICATION

This application claims the priority of India Provisional Patent Application No. 201921033059 filed on Aug. 16, 2019, entitled "DECENTRALIZED MONITORING FRAMEWORK FOR CYBER-PHYSICAL SYSTEMS". The entire contents of the above-mentioned patent application are incorporated herein by reference for all purposes.

FIELD OF THE INVENTION

The present invention relates to a cyber-physical system, and more particularly to a decentralized cyber-physical system with a resilience manager in a monitoring framework.

BACKGROUND OF THE INVENTION

Cyber-physical system (CPS) is a key technology of "Industry 4.0" and is currently a hot topic. By utilizing computers and sensors and linking various devices, machines and digital systems through a new generation of network technology, the communication and interaction between each other are achieved, so that the cyber components and the physical components are intertwined as a smart system.

With the growing scale of CPS implemented in industrial production line, it is challenging to maintain stability under all operating conditions. How to reduce the downtime and increase the resiliency to faults become a crucial issue in system design. Besides, the rapid evolution of CPS has led to a significant increase in system complexity. This further introduces new challenges in satisfying all the system requirements during the design and execution. For example, traditionally, to avoid downtime of a production line, well-trained engineers have to tune various parameters. This process is time consuming and performed over a long period of time, even months. However, manufacturers are now facing ever-shorter product life cycles. As a result, the production line needs to be changed regularly or frequently. While the production line has been changed, it needs to provide a new innovative approach to deal with faults. In other words, since the troubleshooting method has to be adjusted regularly or frequently, it cannot meet the rapidly changing needs of the product and the production line.

In order to increase the fault tolerance and resilience for the CPS, Non-Functional Properties (NFP) are used to evaluate the performance of the systems. In CPSs, an NFP is a specific requirement to assess the Quality of Service (QoS) that the system can provide. For example, execution latency is a critical NFP of CPSs since the users regularly need to finish a mission in a certain period. For this reason, the conventional CPS has a centralized contract called as a root contract, and the NFP of all components in the CPS are monitored in a centralized manner through the centralized contract.

Unfortunately, for a large-scale CPS with numerous components, the source of the faults cannot be identified whenever the system violates the centralized contract.

For solving the above problem of monitoring all components in the CPS in the centralized manner, some studies are beginning to change the CPS to monitor all components in a decentralized manner. However, while the decentralized manner is used to monitor, it makes the CPS sensitive to disturbance. Consequently, one false alarm can impact the entire process of the CPS.

In addition, since the CPS includes the vast number of components, it needs to build a valid contract-based hierarchy to achieve decentralized monitoring of large-scale CPS. On the other hand, how to decompose the root contract and refine the sub-contracts is also a problem to be solved. If the root contract is decomposed and the sub-contract is optimized manually, it causes time-consuming and other problems due to the numerous components.

Therefore, there is a need of providing a decentralized cyber-physical system with a resilience manager in a monitoring framework to overcome the above drawbacks.

SUMMARY OF THE INVENTION

An object of the present invention is to provide a decentralized cyber-physical system with a resilience manager in a monitoring framework. The resilience manager may be generated automatically. By utilizing the decentralized cyber-physical system with the resilience manager, the detection and warning of malfunctioned components are realized accurately, steadily and instantaneously, the downtime is reduced, and a faster fault recovery solution is provided. The decentralized cyber-physical system with the resilience manager of the present disclosure has fault tolerance and flexibility. With the use of Non-Functional Properties (NFP) of each component, the misjudgment of component failures is reduced, so as to prevent the overall operation of the system from being affected due to the misjudgment. In addition, the decentralized cyber-physical system with the resilience manager of the present disclosure is scalable and applicable to a large-scale.

Another object of the present invention is to provide an automated technique to realize a decentralized cyber-physical system with a resilience manager in a monitoring framework. By resiliently managing the decentralized monitoring framework to monitor component failures, it benefits to reduce the communication burden and cost between each component and the managing unit. In addition, the decentralized cyber-physical system with the resilience manager of the present disclosure realize the decentralized monitoring framework by an unwinding technique and a hierarchical technique, which decompose the root-contract into a plurality of sub-contracts and assign the sub-contracts to the corresponding components, or further optimize the sub-contracts, thereby avoiding the problems of time-consuming operation caused by vast number of components in the large-scale CPS.

According to an aspect of the present invention, there is a decentralized cyber-physical system including a managing unit and a plurality of components. The managing unit includes a root resilience manager for monitoring at least one property of the decentralized cyber-physical system. The plurality of components are disposed in a physical space and connected to the root resilience manager. The root resilience manager includes a root contract and a sub-contract generator. The sub-contract generator is configured to decompose the root contract into a plurality of sub-contracts and assign the plurality of sub-contracts to the plurality of components, respectively. Each of the components includes at least one observer configured to monitor if at least one property of the individual component violates the sub-contracts corresponding thereto. When one of the plurality of sub-contracts violates during the runtime of the decentralized cyber-physical system, the root resilience manager issues an alarm.

The above objects and advantages of the present invention become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
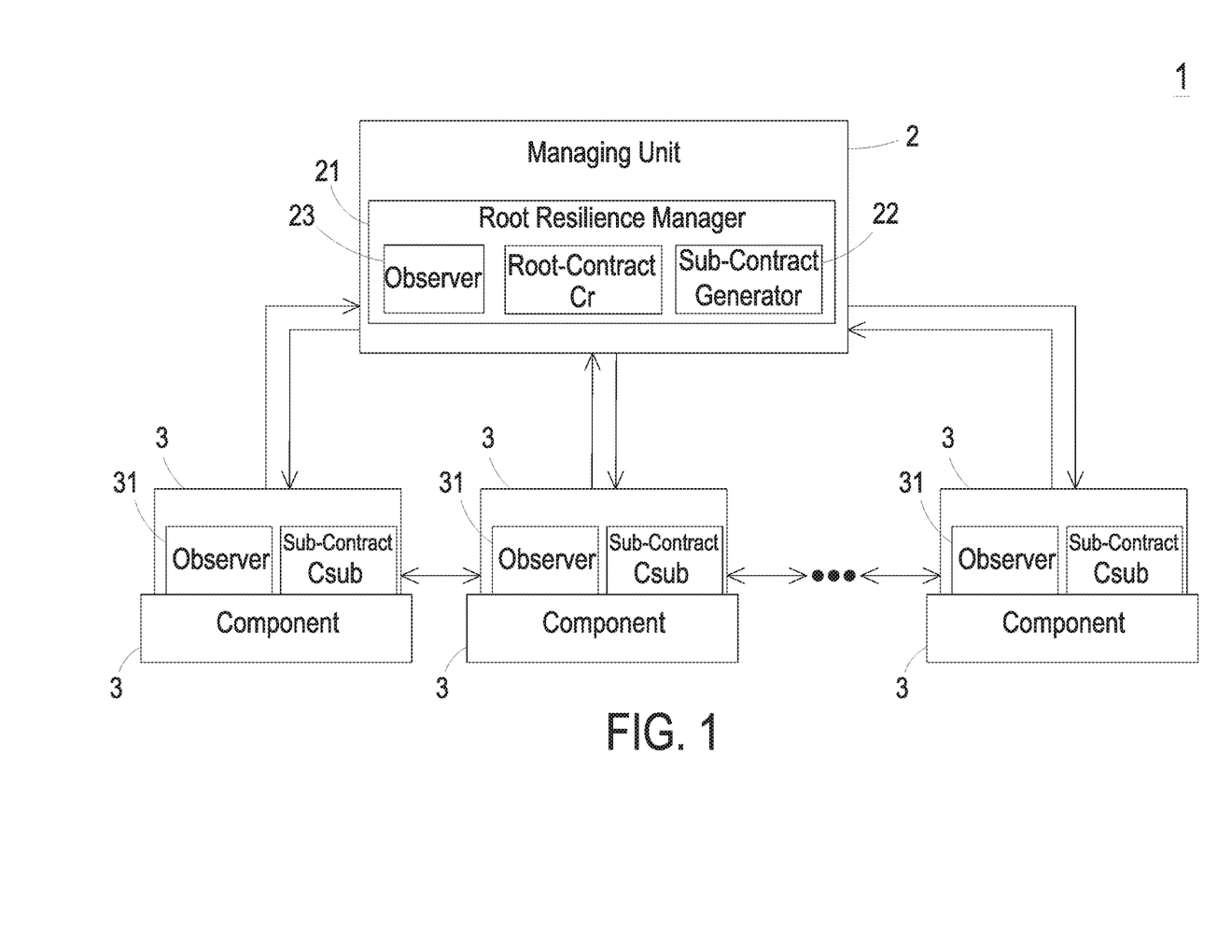
FIG. 1 shows a framework structure of a decentralized cyber-physical system according to a first embodiment of the present invention.

Please refer to FIG. 1. FIG. 1 shows a framework structure of a decentralized cyber-physical system according to a first embodiment of the present invention. In the embodiment, the cyber-physical system 1 (hereinafter referred to as CPS 1) includes a managing unit 2 and a plurality of components 3 to be monitored. The managing unit 2 is connected to the plurality of components 3 through a communication network for monitoring the operations of the components 3 and the overall operations of the CPS 1. The managing unit 2 may be connected to the plurality of components 3 wirelessly or by wire. The managing unit 2 includes a root resilience manager 21. The root resilience manager 21 is configured to monitor at least one non-functional properties (NFP) of the CPS 1. Namely, the NFP, such as the actual operating time and/or the actual energy with respect to the actual voltage and/or the actual current, are monitored in each component 3 by the root resilience manager 21. The root resilience manager 21 includes a root-contract Cr and a sub-contract generator 22. The sub-contract generator 22 is configured to decompose the root-contract Cr into a plurality of sub-contracts Csub. Each sub-contract Csub is assigned to the corresponding component 3, respectively. The plurality of components 3 are disposed in physical space and connected to the root resilience manager 21 through the communication network. In the embodiment, the root resilience manager 21 further includes an observer 23. The observer 23 is configured to determine if the overall NFP of the CPS 1 violates the root-contract Cr while a task is executed by the CPS 1. In the embodiment, each of the components 3 may include a sub-contract Csub and an observer 31. The sub-contract Csub is decomposed, unwound and assigned from the root-contract Cr. In the embodiment, the sub-contract Csub is used to monitor at least one NFP of the corresponding component 3. Preferably but not exclusively, the observer 31 accesses a sensing information from a sensor (not shown) of the component 3, and is configured to determine if the at least one NFP of the component 3 violates the sub-contract Csub corresponding thereto. During the runtime of the CPS 1, if any sub-contract Csub of the corresponding component 3 is violated, the observer 31 corresponding thereto reports the event to the root resilience manager 21 of the managing unit 2, and the root resilience manager 21 of the managing unit 2 issues an alarm, to indicate a fault of the component 3 or provide a solution for failure recovery. Thus, the system downtime is avoided.

In the embodiment, the root-contract Cr is preset in the root resilience manager 21 according to the user requirements, the operating parameters of the CPS 1 and the individual properties of the plurality of components 3. Furthermore, the root-contract Cr is preset with information including the overall NFP of the CPS 1 and the individual minimum NFP of the plurality of components 3. In the embodiment, the overall NFP and the individual minimum NFP are related to the same properties, such as the properties of time and the electrical energy. Preferably but not exclusively, the above NFP are accumulatable. In the embodiment, the CPS 1 is a synchronous system with a global clock. Namely, each component 3 in the CPS 1 has the same time reference, so that an execution time of the CPS 1 for completing a task is counted. Since the CPS 1 is used to complete a task by a specific execution time according to the requirement, the execution latency is regarded as a specific property of the NFP. Preferably but not exclusively, the overall NFP of the CPS 1 is an overall maximum operating time of the CPS 1, and the individual minimum NFP is a minimum operating time of each component 3. Preferably but not exclusively, an unwinding algorithm is preset in the sub-contract generator 22, and the root-contract Cr is decomposed into a plurality of sub-contacts Csub through the unwinding algorithm automatically. Each sub-contract Csub is assigned to the corresponding component 3 respectively. In the embodiment, the sub-contract Csub received by the corresponding component 3 includes the individual minimum NFP of the corresponding component 3.

In the embodiment, the root-contact Cr is decomposed into the plurality of sub-contracts Csub automatically by the unwinding algorithm of the sub-contract generator 22, and each sub-contract Csub is assigned to the corresponding component 3, so that the CPS 1 with the decentralized monitoring framework is realized. In an embodiment, the variables related to the NFP are classified into two categories for the programmable algorithm. The two categories include independent variables and dependent variables. The independent variables are also called as the environment variables. The independent variable is the variable that is controlled and manipulated by the environment. It is independent of the behavior of the components 3 of the CPS 1. The dependent variable is the variable that is generated by at least one part of the component 3 of the CPS 1. Therefore, the truth value of the dependent variable depends on the truth values of some other dependent variables.

In an unwinding process of the root-contract Cr, the overall NFP of the root-contract Cr are transforming into another form by resolving dependency relationship between the variables. The unwinding process is preformed to the set of the dependent variables in formula. The unwinding process is conducted in a backward fashion starting from the dependent variable needing to unwind until the components 3 in a dependency chain whose inputs are all independent variables. The complexity of the unwinding process depends on the number of dependent variables in the formula and the dependency relationships of each dependent variable (i.e. how many variables affect the truth value of that dependent variable).

Figure 2:
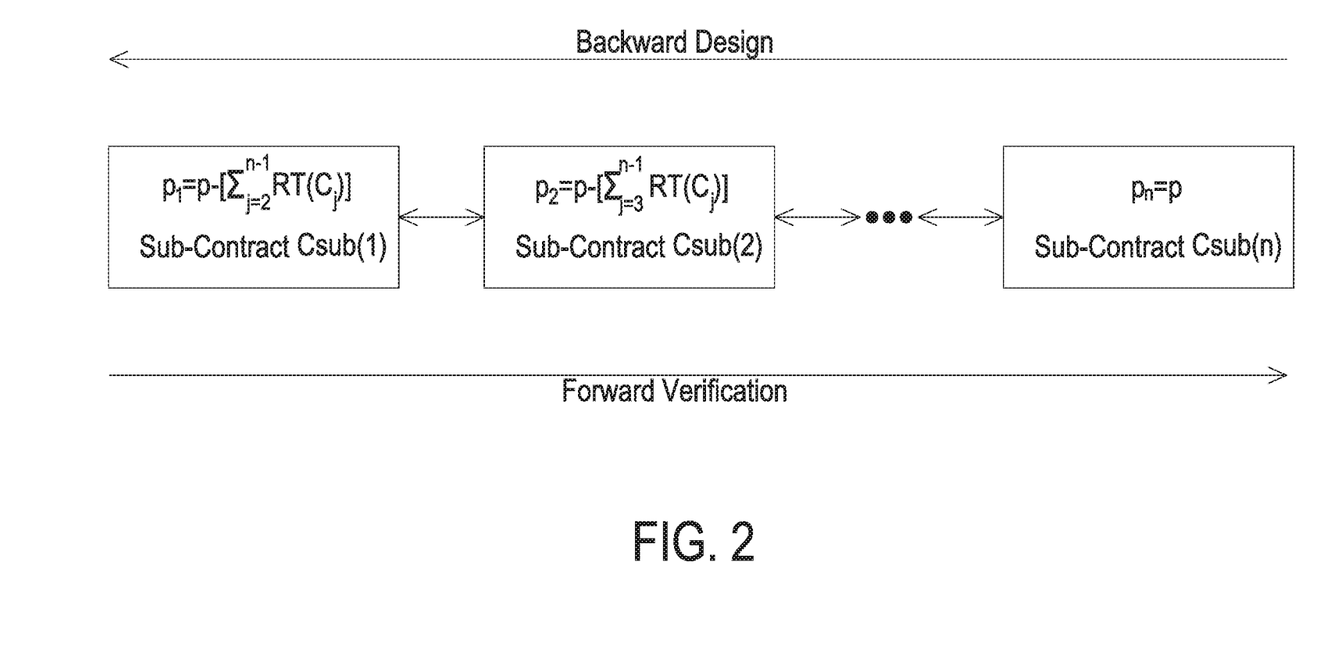
FIG. 2 shows an architecture of an unwinding technique according to the first embodiment of the present invention.

In the embodiment, the sub-contract generator 22 includes an unwinding algorithm, and a non-functional formula and a dependency graph are taken as two inputs of the unwinding algorithm. The relationships of the physical and behavioral properties of the plurality of components 3 of the CPS 1 during operation, the individual minimum NFP of all components 3, and the overall NFP of the root-contract Cr are recorded in the dependency graph. The NFP are formulated by the non-functional formula. With examining the foregoing dependency graph of the CPS 1, the non-functional formula is transformed into another equivalent formula by the sub-contract generator 22. In order to decompose and unwind the root-contract Cr into the plurality of sub-contracts Csub and assign the sub-contracts Csub to the corresponding components 3, the CPS 1 is assumed to satisfy the following assumptions: (1) The CPS 1 is a synchronous system with a global clock; and (2) each component 3 of the CPS 1 is regarded as one process p and has a minimum response time (denoted as $RT_p^{min}$). A response time of each process p is available. $RT_p^{min}$ is the minimum time needed by process p to produce its output once the minimal set of required inputs to that process are available. FIG. 2 shows an architecture of an unwinding technique according to the first embodiment of the present invention. As shown in FIG. 2, by employing the unwinding technique, the root-contact Cr is decomposed into a plurality of sub-contracts Csub1, Csub2 . . . Csubn (where n is the total number of the components 3), and each of sub-contracts Csub1, Csub2 . . . Csubn is assigned to the corresponding component 3 of the plurality of components 3. In the embodiment, each of sub-contracts Csub1, Csub2 . . . Csubn is used to monitor the individual NFP of the corresponding component 3 in the CPS 1.

Preferably but not exclusively, a backward design is used to compute the parameters for each sub-contract Csub1, Csub2 . . . Csubn. For the run-time verification, the sub-contracts Csub1, Csub2 . . . Csubn are verified in a forward direction. Furthermore, based on the concept of the present disclosure, a local violation is a global violation. Namely, if the sub-contract Csub1, Csub2 . . . Csubn assigned to the corresponding component 3 is violated, the root-contract Cr is violated. Thus, an early detection of the fault is achieved by this design.

In an embodiment, the unwinding algorithm used by the sub-contract generator 22 has a non-functional formula $p_i=p-[\Sigma_{j=i+1}^{n-1}(RT^{min}(C_j))]$: where p is the original timing parameter for the entire CPS 1, and n is the total number of the components 3. By using the foregoing formula, the timing parameter $p_i$ for each of sub-contracts Csub is computed, and a backward design is produced. On the other hand, when a sub-contract Csub violates its own timing parameter and issues an alarm, a forward verification is enabled to work. Any sub-contract Csub of the corresponding component 3 that issues the alarm indicates that the whole process p of the CPS 1 will fail since there is no longer sufficient time left for the entire CPS 1 to complete the task. Thus, an early detection of faults is realized instead of waiting for the entire system to complete the task before determining that a failure has occurred.

Based on the above descriptions, the root-contract Cr of the CPS 1 of the present disclosure is decomposed and unwound into a plurality of sub-contract Csub automatically, and each sub-contract Csub is assigned to the corresponding component 3 of the plurality of components 3, so that the CPS 1 with the decentralized monitoring framework is realized. By employing the CPS 1 of present disclosure, an early detection of the fault is achieved and an early alarm is issued. Moreover, it benefits to provide a fault recovery solution to reduce the downtime. In addition, after the root-contact Cr is decomposed into the plurality of sub-contract Csub automatically and assigned to monitor the plurality of the components 3, the extra communication between the components 3 and the managing unit 2 is reduced or not even needed once the monitoring is initiated. It is advantageous of reducing the communication burden and cost between the components 3 and the managing unit 2.

Figure 3:
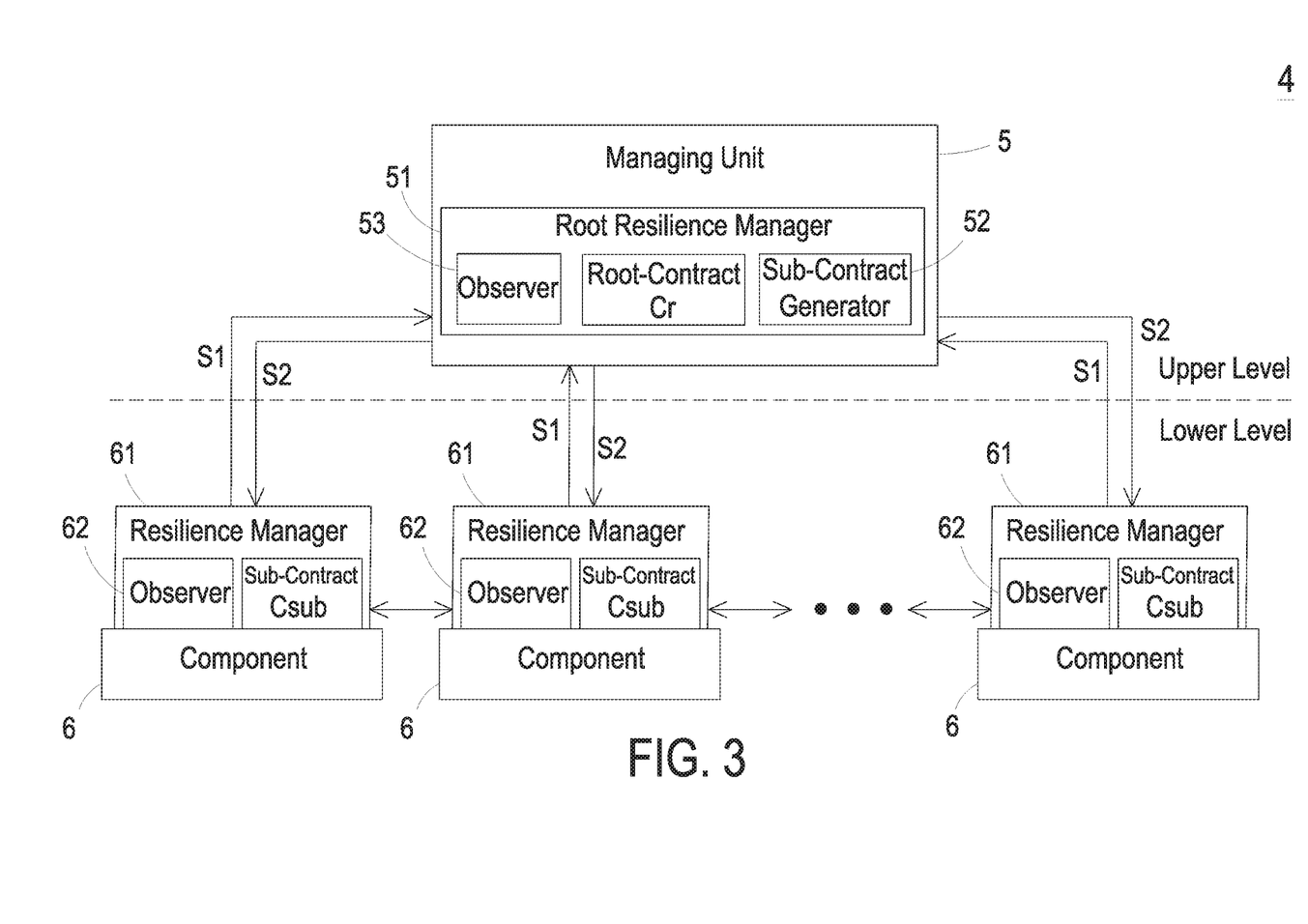
FIG. 3 shows a framework structure of a decentralized cyber-physical system according to a second embodiment of the present invention.

Please refer to FIG. 3. FIG. 3 shows a structure of a decentralized cyber-physical system according to a second embodiment of the present invention. In the embodiment, the decentralized cyber-physical system 4 (hereafter referred to as CPS 4) includes a managing unit 5 and a plurality of components 6 to be monitored. In the embodiment, the managing unit 5 and the plurality of components 6 are located at the physical space. The managing unit 5 is connected to the plurality of components 6 through a communication network for monitoring the operations of the components 6 and the overall operations of the CPS 4. The managing unit 5 includes a root resilience manager 51. Each of the plurality of components 6 includes a resilient manager 61. In the embodiment, the root resilient manager 51 and the plurality of resilient managers 61 are configured to form a resilience management framework divided into at least two levels. The root resilient manager 51 is disposed in a logical upper level (or nonleaf-level or root-level), and the plurality of resilient managers 61 are disposed in a logical lower level (or leaf-level). These managers follow a communication protocol that dictates to whom and what to talk about. Due to the protocol, a virtual management hierarchy of the managers and their associated contracts are created. The root resilience manager 51 is configured to monitor at least one non-functional properties (NFP) of the CPS 4. Namely, the NFP, such as the actual operating time and/or the actual energy with respect to the actual voltage and/or the actual current, are monitored in each component 6 by the root resilience manager 51. The root resilience manager 51 includes a root-contract Cr, a sub-contract generator 52, and an observer 53. The sub-contract generator 52 is configured to decompose the root-contract Cr into a plurality of sub-contracts Csub. The observer 53 is configured to monitor and determine if the overall NFP of the CPS 4 violates the root-contract Cr while a task is executed by the CPS 4. Each sub-contract Csub is assigned to the corresponding component 6 of the plurality of components 6. In the embodiment, the root resilience manager 51 further define a criterion, for example based on the individual NFP of the plurality of components 6, so that the sub-contracts Csub are optimized by the sub-contract generator 52. The plurality of resilient managers 6 of the components 6 are connected to the root resilience manager 51 through the communication network. In the embodiment, the resilience manager 61 of the component 6 is configured to monitor and manage the operation of the component 6. Namely, the resilient manager 61 makes resilient decisions based on the information from its sub-contract as well as the other resilient manager 61. Each resilience manager 61 of the component 6 includes a sub-contract Csub and an observer 62. The sub-contract Csub is decomposed, unwound and assigned from the root-contract Cr. In the embodiment, each sub-contract Csub is used to monitor the properties of the corresponding component 6 by the observer 62. Preferably but not exclusively, the observer 62 accesses sensing information from a sensor of the component 6, and is configured to monitor and determine if the NFP of the corresponding component 6 violates the sub-contract Csub corresponding thereto. During the runtime of the CPS 4, if any sub-contract Csub of the corresponding component 6 is violated, the resilience manager 61 tries to recover locally. If no local solution exists, the resilient manager 61 informs the root resilience manager 51 and transmits the fault information S1 such as the extent of failure (e.g., amount of contract violation) to the root resilience manager 51 so as to issues an alarm to indicate a fault of the component 6 or provide a faster fault recovery solution. Thus, the system downtime is avoided. In an embodiment, after the root resilience manager 51 receives the fault information S1, the root resilience manager 51 may transmit updated parameter values S2 for the sub-contract. If no updated parameter values are received by the resilient manager 61, it implies that the fault has been successfully handled at higher-level in the hierarchy without any system degradation. In an embodiment, the root resilient manager 51 monitors whether the plurality of components 6 duly collaborate to meet requirements. The root resilient manager 51 receives fault information S1 from the lower-level resilient manager 61 and tries to recover locally. If the solution requires system degradation, new parameter values are generated and communication to all of the plurality of resilient managers 61.

In the embodiment, the root-contract Cr may be preset in the root resilience manager 51 according to the user requirements, the operating parameters of the CPS 4, and the individual properties of the plurality of components 6. Furthermore, the root-contract Cr may be preset with information including the overall NFP of the CPS 4 and the individual NFP of the plurality of components 6. In the embodiment, the overall NFP and the individual NFP are related to the same properties, such as the properties of time and the electrical energy. Preferably but not exclusively, the above NFP are accumulatable.

In the embodiment, the sub-contract generator 52 includes a proposed algorithm, and a non-functional formula and a dependency graph are taken as two inputs of the proposed algorithm. The relationships of the physical and behavioral properties of the plurality of components 6 of the CPS 4 during operation, the individual NFP of all components 6, and the overall NFP of the root-contract Cr are recorded in the dependency graph. The NFP are formulated by the non-functional formula. In the embodiment, while a certain part of CPS 4 does not meet the conditions to build a global clock, the foregoing dependency graph of the CPS 1 and the non-functional formula are utilized to decompose the root-contract Cr into a plurality of sub-contracts Csub in a contract-based hierarchy. The root-contract Cr specifies the overall requirement for the NFP, and the plurality of sub-contracts Csub monitor the NFP of an individual component 6. During the runtime of the CPS 4, the observers 62 monitor the behaviors of the components 6. In an embodiment, if any abnormal behavior violates a sub-contract Ccub, the observer 62 of the corresponding component 6 reports the fault information S1 to the root resilience manager 51, indicating a fault. The root resilience manager 51 verifies whether the report is a false alarm by analyzing the overall information of the CPS 4 available to it. In the contract-based hierarchy of the present embodiment, the root contract Cr monitors the overall NFP of the CPS 4, during which, the sub-contracts Csub capture specific properties of the individual corresponding components 6. In the embodiment, a certain part of the components 6 in the contract-based hierarchy are configured to define at least one criterion according to the solutions of an optimization problem, which characterizes the tradeoff between communication cost and flexibility of the CPS 4. In an embodiment, the root contract Cr monitors an overall execution latency as the overall NFP of the CPS 4, during which, the observers 62 of the corresponding components 6 capture individual execution latencies as the specific properties of the individual corresponding components 6. Preferably but not exclusively, mean execution times and standard deviation for each component 6 are captured and fed into the sub-contract generator 52. The plurality of sub-contracts Csub are refined by the proposed algorithm of the sub-contract generator 52 according to the given criteria, so as to achieve the desired performance, e.g., reducing the communication cost as well as enhancing the resistance to the unknown disturbance. Namely, the plurality of sub-contracts Csub are refined based on the individual NFP of the plurality of components 6.

Based on the above descriptions, the root-contract Cr of the CPS 4 of the present embodiment may be decomposed into a plurality of sub-contracts Csub by the proposed algorithms without knowing the details of the components 6. In addition, with the criteria given according to the solutions of an optimization problem, the proposed algorithms can refine the sub-contract Csub to achieve the desired performance for reducing the communication cost as well as enhancing the resistance to the unknown disturbance. Moreover, according to different requirements and properties of the CPS 4, the root resilience manager 51 adjusts parameters to achieve different performance. It facilitates the proposed algorithms to capture the heterogeneous properties of the components 6 in a large-scale CPS. Furthermore, while the proposed algorithm has a plug-and-play feature, the proposed algorithm can efficiently develop and refine a new sub-contract whenever the CPS 4 adds a new component.

Figure 4:
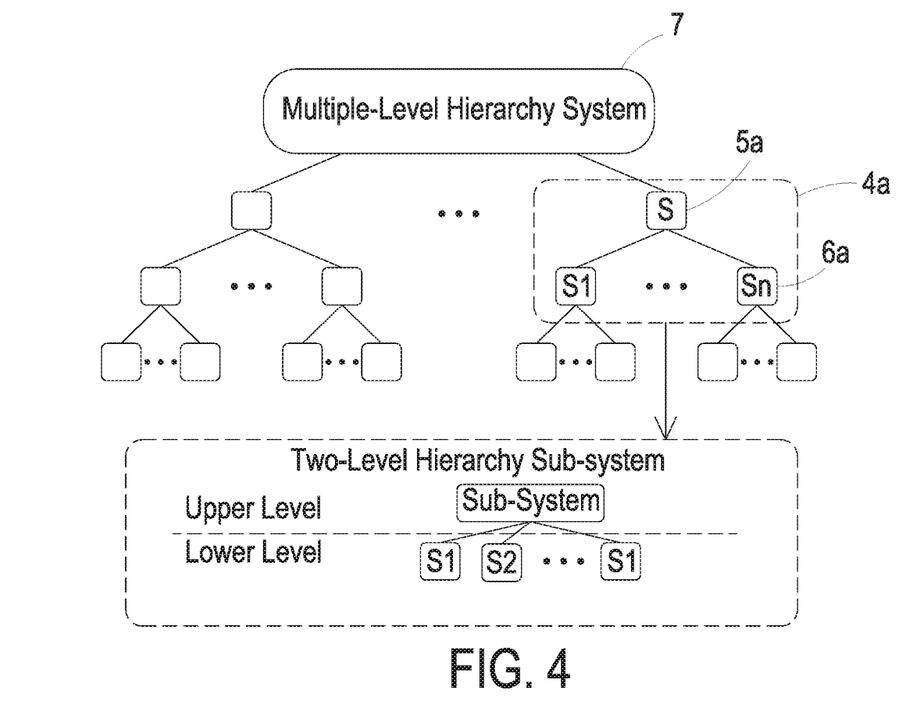
FIG. 4 shows a framework structure of a decentralized cyber-physical system according to a third embodiment of the present invention.

Based on the root-contract Cr and the sub-contracts Csub, the foregoing resilience management hierarchy is designed to have at least two levels, called as two-level hierarchy system. In other embodiment, a plurality of two-level hierarchy systems are used to form a multiple-level hierarchy system for a large-scale CPS. FIG. 4 shows a framework structure of a decentralized cyber-physical system according to a third embodiment of the present invention. In the embodiment, the cyber-physical system 7 (hereinafter referred to as CPS 7) is configured to form a multiple-level hierarchy system. The cyber-physical system 7 includes at least one sub-system 4a, which is a two-level sub-system. In the embodiment, the sub-system 4a has the similar structures, elements, and functions as those of the foregoing embodiment in FIG. 3, and includes a managing unit 5a and a plurality of component 6a. The managing unit 5a and the component 6a also have the similar structures, elements, and functions as the managing unit 5 and the component 6 of the foregoing embodiment in FIG. 3, and are not redundantly described herein. In an embodiment, the component 6a further includes a two-level hierarchy system, and regarded as a further sub-system of the managing unit 5a. In other embodiment, the component 6a is regarded as a sub-system and has the similar structures, elements, and function as those of the foregoing embodiment in FIG. 1. Accordingly, the cyber-physical system of the present disclosure provides a decentralized monitoring framework including a concept of a resilience management hierarchy for a large CPS.

In the above embodiment, each of the root-contract Cr and the sub-contract Csub is regarded as a description of (1) inputs and outputs of a component 6, 6a or subsystem 4a, (2) assumptions on the inputs and environment, and (3) required guarantees about the outputs or behavior of the component 6, 6a or sub-system 4a. In the embodiment, a variant of the system is used to design the root-contract Cr and the sub-contracts Csub, called as parametric contracts, that allow parameterized specification of assumptions and guarantees so that these can be updated at runtime simply by changing the parameter values.

A set of the root-contract Cr and the sub-contracts Csub is assigned to the root resilience manager 51 and the resilience manager 61 in the decentralized monitoring framework of the embodiment of the present disclosure. For a given contract, runtime observers 53, 62 check whether the expected behaviors are generated by the components 6, 6a or sub-system 4a of concern.

In the embodiment, the observers 62 can be expressed using different formalisms such as finite state machines and timed and hybrid automata. Upon the failure of the sub-contract Csub, a fault is triggered, and the root resilience manager 51 performs an analysis to determine whether any solutions within its scope can be applied. This analysis could depend on the number and extent of contract failures. If the chosen solution requires a parameter update, then the observer 62 is informed accordingly. If no solution is found, the resilience manager 61 informs the root resilience manager 51, providing information about the fault. The root resilience manager 51, in turn, uses failure information from its own sub-contracts Csub as well as from the resilience managers 61 to perform further fault recovery. If the chosen recovery procedure at any level necessitates an update to contract parameters, the update is communicated to all resilience managers 61. Thus, throughout the process, only fault information and parameter values are exchanged between the root resilience manage 51 and the resilience managers 61.

In an embodiment, user-provided end-to-end requirements and the capabilities of the components 6, 6a are used to generate the root-contract Cr and the sub-contract Csub. The capabilities of the components 6, 6a are first used to define the sub-contracts Csub in the lower level. Preferably but not exclusively, the sub-contracts Csub for the components 6, 6a with the resilience manager 61 could be derived from information about the host hardware and available behaviors of other alternate components 6, 6a. In other embodiment, the sub-contracts Csub from different components 6a in the subsystem 4a could then be composed to derive upper-level contracts (i.e. the root-contract Cr) in the multiple-level hierarchy system.

In an embodiment, the parameters of the root-contract Cr and the sub-contract Csub are derived based on tunable performance knobs available in the system. For example, in manufacturing plants, the speed of conveyor belts can be used as a parameter to degrade the plant's throughput.

In an embodiment, functions based on these parameters are used in assumptions and guarantees of the root-contract Cr and the sub-contracts Csub. The assumptions and guarantees are defined using any desired logic. Preferably but not exclusively, Boolean logic-based guarantees are used to define assumptions and guarantees, efficient observers are implemented.

In the embodiment, when sub-contracts Csub are composed for refinement in the multiple-level hierarchy system, the resulting hierarchy should satisfy desirable properties for contract composition and refinement. In particular, the composition of a set of the sub-contracts Csub belonging to the components 6, 6a or the sub-systems 4a disposed in the logical lower level is a refinement of the root-contract Cr disposed in the logical upper level. Additionally, it is important to ensure that the root-contract Cr in the upper level satisfies (is a refinement of) user-provided end-to-end requirements.

On the other hand, in order to form the contract-based hierarchical framework of the present disclosure, the unwinding technique as described in the first embodiment, and the hierarchical technique as described in the second and third embodiments are provided to form the cyber-physical system with the decentralized monitoring framework.

Notably, both of the unwinding technique and the hierarchical technique for forming the framework of the present disclosure takes in two inputs:
1. Knowledge graph which describes the physical and behavioral properties of various components 6, 6a in the CPS 1, 4.
2. Requirements on what to achieve.

Preferably but not exclusively, in manufacturing, once combine with knowledge and requirement inputs to form the CPS 1, 4, the objectives like minimize downtime can be performed. The frameworks of the CPS 1, 4 are able to generate fault detection and response mechanism which at runtime detect faults and respond. The frameworks of the CPS 1, 4 are generic and can be applied to other domains such as building automation and ICT and Energy infrastructure, besides manufacturing.

With utilizing the CPS 1, 4 of the present disclosure, it benefits to minimize the dependency on human resources. Moreover, the knowledge graph allows the system to capture the physical and behavioral relation between components 6, 6a. The frameworks of CPS 1, 4 are flexible and evolves dynamically at runtime based on the changes captured using the knowledge graph. In addition, the frameworks of the CPS 1, 4 enable a systematic approach to detect faults and automatically respond to faults. It can also easily tune the parameters of the CPS 1, 4 for optimization.

Figure 5:
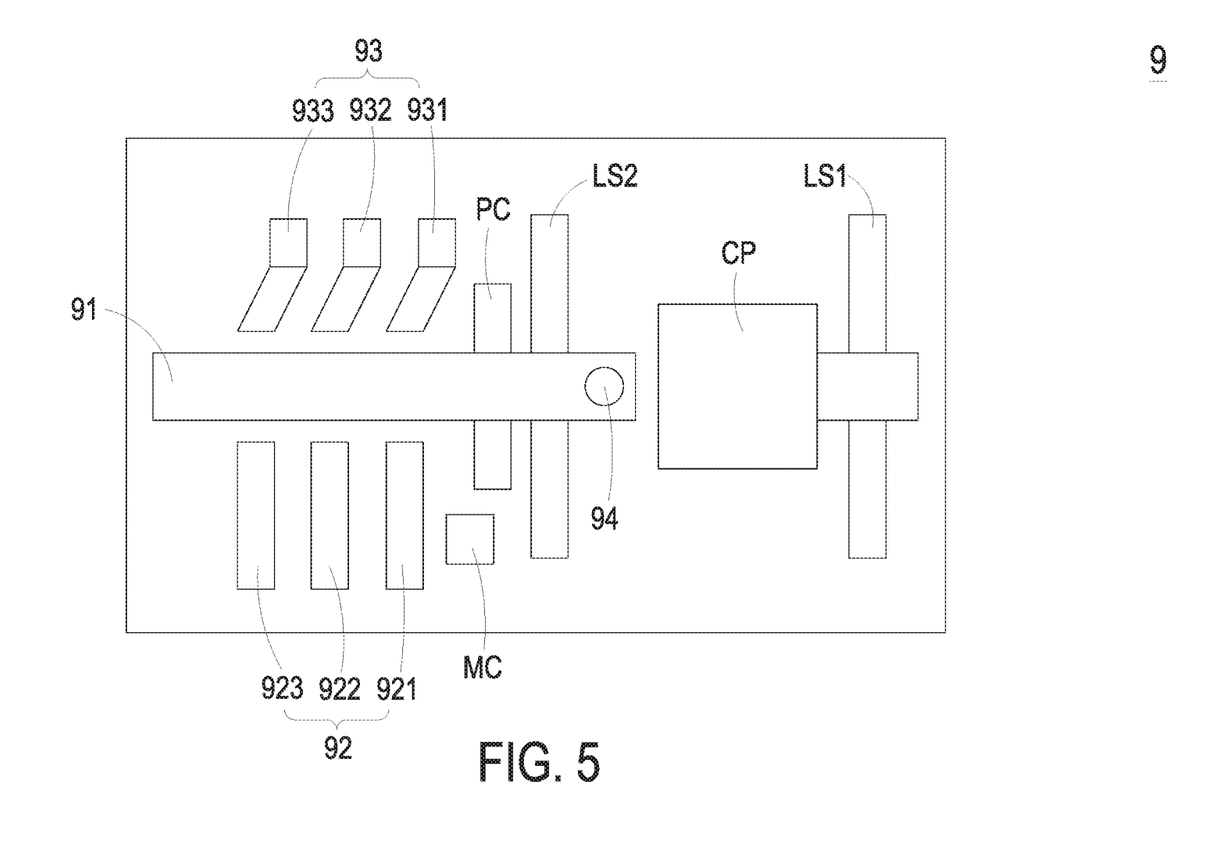
FIG. 5 is a schematic perspective view illustrating an exemplary testbed of the decentralized cyber-physical system of the embodiments of the present invention.
Figure 6:
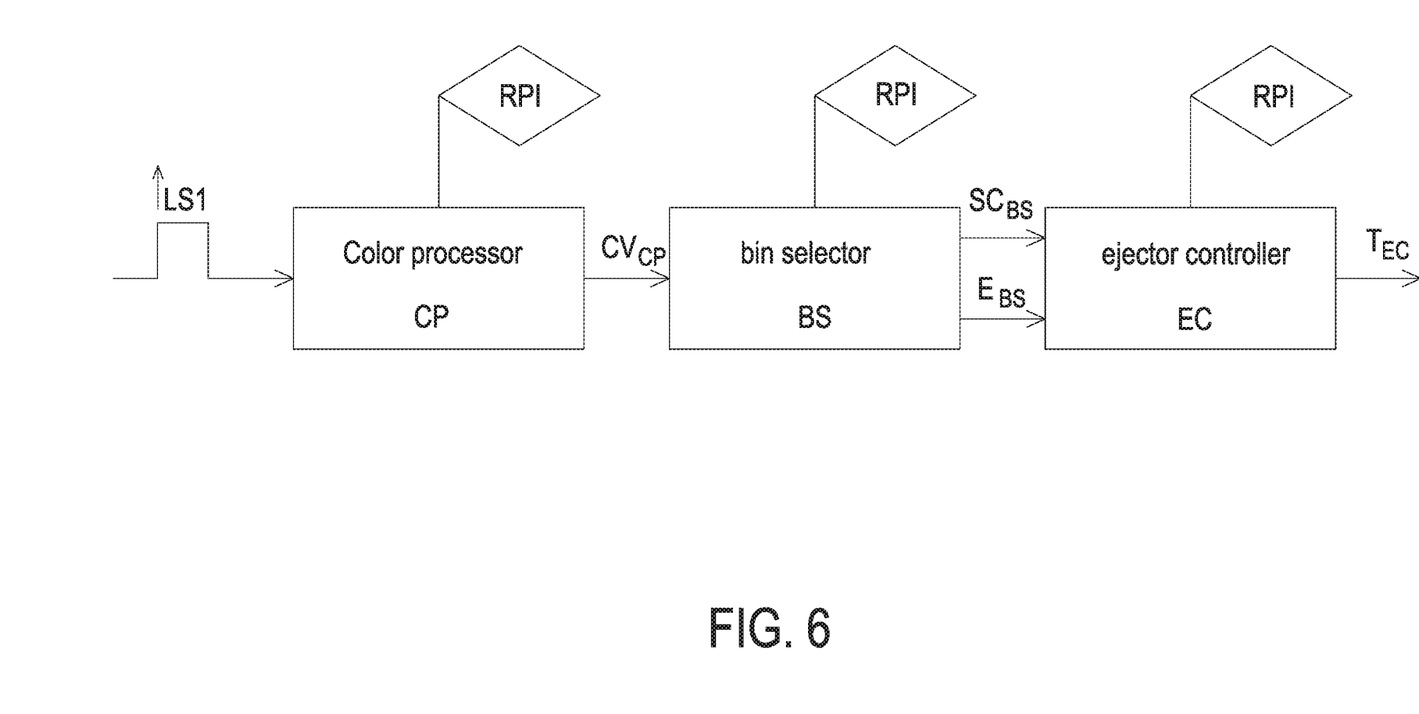
FIG. 6 shows the structure and operation process of the testbed of FIG. 5.

FIG. 5 is a schematic perspective view illustrating an exemplary testbed of the decentralized cyber-physical system of an embodiment of the present invention. FIG. 6 shows the structure and operation process of the testbed of FIG. 5. As shown in FIGS. 5 and 6, the exemplary testbed 9 of the CPS is implemented by a fischertechnik testbed. The testbed 9 can generate some fault scenarios so as to observe the operations of the CPS in Industry 4.0 environment. The testbed 9 includes two light sensors LS1, LS2, a conveyer belt 91, three ejectors 92 and three bins 93, a motor collector MC, a pulse counter PC, a color processor CP, a bin selector BS, and an ejector controller EC. The two light sensors LS1, LS2 include a first light sensor LS1 and a second light sensor LS2 for sensing light. The conveyer belt 91 is configured to carry a token 94 to move. The three ejectors 92 include a first ejector 921, a second ejector 922, and a third ejector 923 and are disposed on one side of the conveyer belt 91 and spaced apart with each other. The ejector 92 is configured to eject the token 94. The three bins 93 include a first bin 931, a second bin 932, and a third bin 933 and are disposed on the other side of the conveyer belt 91 and spaced apart with each other. The three bins 93 are corresponding to the three ejectors 92 one by one and are configured to receive the token 94 ejected by the corresponding ejector 92. The motor collector MC is configured to control the speed of the motor (not shown) that rotates the conveyor belt 91. The pulse counter PC is configured to count the number of steps that passed through the first light sensor LS1. The color processor CP is used for color identification. The bin selector BS is used for determining the number of the bins 93. The ejector controller EC is used for ejecting the token 94 to the corresponding bin 93. The goal of the testbed 9 is to ensure that the tokens 94 are correctly ejected in the bins 93.

When the token 94 is placed on the conveyor belt 91 and close to the first light sensor LS1, the first light sensor LS1 detects the presence of the token 94 and activates the color processor CP. When the conveyor belt 91 carries the token 94 to pass through the color processor CP, the color sensor of the color processor CP detects the token's color and output the annotated color value signal (CVcp) to the bin selector BS. The bin Selector BS (i.e. the decision-making component) then calculates the step count at which the token 94 reaches either the first ejector 921, second ejector 922 or third ejector 923. In this calculation, the step number at which the color processor CP was activated is used. The calculation result outputs step number signal $SC_{BS}$ to be sent to the ejector controller EC. Moreover, depending on the color of the token 94, the bin selector BS outputs ejector number signal $E_{BS}$ to dictate the ejector controller EC with regards to which ejector 92 must be activated. The appropriate ejector 92 activates as soon as the step number signal $SC_{BS}$ and the ejector number signal $E_{BS}$ are received by the ejector controller EC. In this implementation, only the first ejector 921, the second ejector 922, first bin 931, the second bin 932, and white tokens 94 are used. Under normal operation, the while token 94 would be ejected into the first bin 931 by the first ejector 921. In case that a fault that requires changes to the speed of the conveyor belt 91, and the second bin 932 is used temporarily until fault-recovery is completed. In the embodiment, the color processor CP, the bin selector BS and the ejector controller EC are considered as components of the CPS.

As shown in FIG. 6, instead of traditional PLCs, three Raspberry Pi 3 (RPI) are introduced to hold the control logic of the color processor CP, the bin selector BS, and the ejector control EC. All the RPIs are interconnected over ethernet through a network switch. The RPI is well-known in the art, and is not redundantly described herein. To introduce resilience management and fault injection capability on the testbed 9, FORTE (i.e. a runtime environment integrated with 4DIAC-IDE) is used on the RPI. 4DIAC-IDE is based on the IEC 61499 standard, which is an event-driven function block model for distributed control systems. The resilient framework of this embodiment is built on the top of 4DIAC-IDE.

Figure 7:
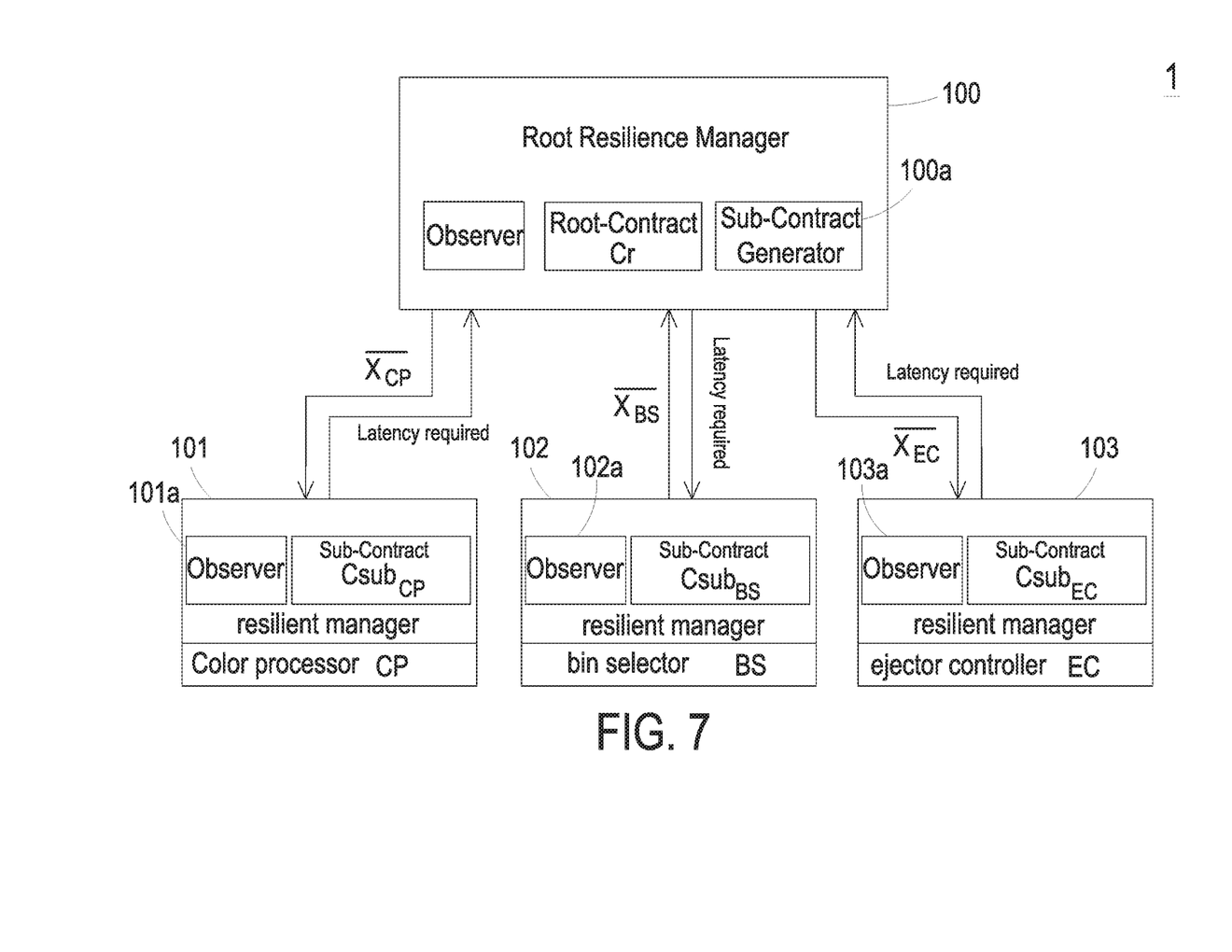
FIG. 7 shows the resilience management framework of the testbed of the CPS according to the embodiment of the present invention.
Figure 8:
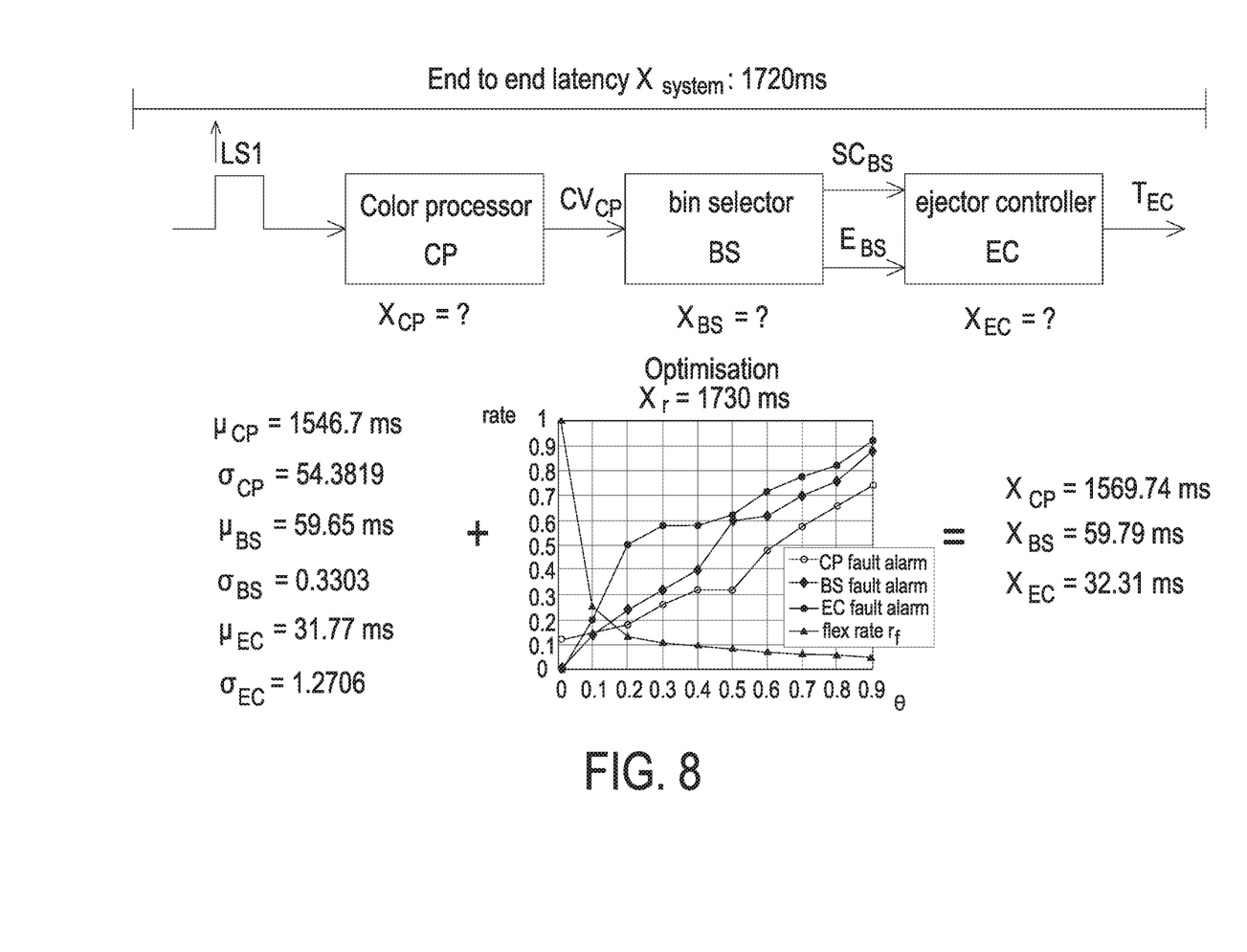
FIG. 8 shows the component characteristics and optimization based on the resilience management framework of FIG. 7.

FIG. 7 shows the resilience management framework of the testbed of the CPS according to one embodiment of the present invention, and FIG. 8 shows the component characteristics and optimization based on the resilience management framework of FIG. 7. In this embodiment, as shown in FIG. 7, the resilience management framework of the testbed 9 includes a two-level management hierarchy. There are three components including the color processor CP, the bin selector BS, and the ejector controller EC. Each component includes a resilient manager 101, 102, 103 located at a logically lower lever (i.e. leaf level). A root resilient manager 100 is located at a logically upper level (i.e. root level). The resilient managers 101, 102, 103 use parameterized latency-related contracts (i.e. sub-contracts) for the components. The root resilient manager 100 uses the root contract Cr composed of the sub-contracts $Csub_{(CP)}$, $Csub_{(BS)}$, $Csub_{(EC)}$ of the resilient managers 101, 102, 103. The contracts are generated based on the user provided requirements and the capabilities of the components used.

The sub-contracts $Csub_{(CP)}$, $Csub_{(BS)}$, $Csub_{(EC)}$ of the resilient managers 101, 102, 103 are generated by decomposing the root contract Cr by the sub-contract generator 100a of the root resilient manager 100. The content of each of the sub-contracts $Csub_{(CP)}$, $Csub_{(BS)}$, $Csub_{(EC)}$ includes input, output, parameter, assumption and guarantee. Each component should generate the output within an execution time, so that the sub-contracts $Csub_{(CP)}$, $Csub_{(BS)}$, $Csub_{(EC)}$ also include respective execution times. The observers 101a, 102a, 103a of the resilient managers 101, 102, 103 monitor the respective contents of the sub-contracts (e.g., guarantee) and also record the actual component execution latencies. When a sub-contract $Csub_{(CP)}$, $Csub_{(BS)}$, $Csub_{(EC)}$ fails, the resilient manager 101, 102, 103 directly reports the fault to the root resilient manager 100 together with the information about the actual latency of the component. The root resilient manager 100 is responsible for the root contract Cr. It checks whether the contents of all sub-contracts $Csub_{(CP)}$, $Csub_{(BS)}$, $Csub_{(EC)}$ are satisfied. Further, to allow for dynamic slack management among the components, contract refinement is used so that the sum of the execution times for all the components is less than a predetermined total execution time for the system. The difference between these two values is the latency slack available within the root resilient manager 100. If the reported actual latencies from the lower-level resilient manager 101, 102, 103 are within the slack, then on further action is taken by the root resilient manager so that error alarm can be avoided. This clearly shows the benefit of having contract hierarchy as latency can be dynamically distributed at runtime among the components. In addition, in an embodiment, after the hierarchy is set, the parameters that are included in the sub-contract and used for monitoring each component are fine turned. Mean execution times (e.g., $\mu_{CP}$, $\mu_{VS}$, $\mu_{EC}$) and its standard deviation (e.g., $\sigma_{CP}$, $\sigma_{BS}$, $\sigma_{EC}$) for each component shown in FIG. 8 are fed into the optimization algorithm and the corresponding execution time values Xi (e.g., $X_{CP}$, $X_{BS}$, $X_{EC}$) generated can be used for monitoring the contract violations.

The resilient management framework of the present disclosure can be implemented onto a production line or on other embedded platforms running on the production floor, but not limited thereto.

In conclusion, the present invention provides a decentralized cyber-physical system with a resilience manager in a monitoring framework. The resilience manager may be generated automatically. By utilizing the decentralized cyber-physical system with the resilience manager, the detection and warning of malfunctioned components are realized accurately, steadily and instantaneously, the downtime is reduced, and a faster fault recovery solution is provided. The decentralized cyber-physical system with the resilience manager of the present disclosure has fault tolerance and flexibility. With the use of Non-Functional Properties (NFP) of each component, the misjudgment of component failures is reduced, so as to prevent the overall operation of the system from being affected due to the misjudgment. In addition, the decentralized cyber-physical system with the resilience manager of the present disclosure is scalable and applicable to a large-scale. Moreover, by resiliently managing the decentralized monitoring framework to monitor component failures, it benefits to reduce the communication burden and cost between each component and the managing unit. In addition, the decentralized cyber-physical system with the resilience manager of the present disclosure realize the decentralized monitoring framework by an unwinding technique and a hierarchical technique, which decompose the root-contract into a plurality of sub-contracts and assign the sub-contracts to the corresponding components, or further optimize the sub-contracts, thereby avoiding the problems of time-consuming operation caused by vast number of components in the large-scale CPS.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A decentralized cyber-physical system, comprising:
    a managing unit comprising a root resilience manager for monitoring at least one property of the decentralized cyber-physical system; and
    a plurality of components disposed in a physical space and connected to the root resilience manager,
    wherein the root resilience manager comprises:
        a root contract; and
        a sub-contract generator configured to decompose the root contract into a plurality of sub-contracts and assign the plurality of sub-contracts to the plurality of components, respectively,
    wherein each of the plurality of components comprises at least one observer configured to monitor if at least one property of the individual component violates the sub-contracts corresponding thereto, wherein when one of the plurality of sub-contracts violates during the runtime of the decentralized cyber-physical system, the root resilience manager issues an alarm;
    wherein the sub-contract generator comprises at least one algorithm, and a non-functional formula and a dependency graph are taken as two inputs of the at least one algorithm;
    wherein the decentralized cyber-physical system is a synchronous system with a global clock, and each of the plurality of components includes one process and has a minimum response time, wherein the root-contract is decomposed and unwound into the plurality of sub-contracts by the non-functional formula:

$p_i = p - [\Sigma_{j=i+1}^{n-1}(RT^{min}(C_j))]$ wherein $p_i$ is a timing parameter for the sub-contract of the corresponding component, p is an original timing parameter of the decentralized cyber-physical system, $RT^{min}$ is the minimum response time of the corresponding component, $C_j$ are the plurality of sub-contracts, and n is the total number of the plurality of components.

2. The decentralized cyber-physical system according to claim 1, wherein the at least one property of the decentralized cyber-physical system and the at least one property of the individual component are non-functional property.

3. The decentralized cyber-physical system according to claim 2, wherein the observer is configured to determine if the non-functional property of the corresponding component violates the sub-contract corresponding thereto.

4. The decentralized cyber-physical system according to claim 2, wherein the plurality of sub-contracts are refined based on the individual non-functional properties of the plurality of components.

5. The decentralized cyber-physical system according to claim 2, wherein the root resilient manager further comprises an observer configured to determine if an overall non-function property of the decentralized cyber-physical system violates the root-contract.

6. The decentralized cyber-physical system according to claim 1, wherein the non-functional formula and the dependency graph are utilized to decompose the root-contract into a plurality of sub-contracts.

7. The decentralized cyber-physical system according to claim 1, wherein the timing parameter for each of the sub-contracts is computed in backward design, and the sub-contracts of the plurality of components are verified in a forward direction.

8. The decentralized cyber-physical system according to claim 1, wherein each of the plurality of components further comprises a resilience manager, and the root resilient manager and the plurality of resilient managers of the decentralized cyber-physical system are configured to form a multiple-level hierarchy system.

9. The decentralized cyber-physical system according to claim 8, wherein the root resilient manager is disposed in a logical upper level, the plurality of resilient managers are disposed in a logical lower level, and the decentralized cyber-physical system is configured to form a two-level hierarchy system.

10. The decentralized cyber-physical system according to claim 1, wherein the plurality of sub-contracts are optimized by the sub-contract generator of the root resilient manager.

* * * * *